Patented Oct. 25, 1927.

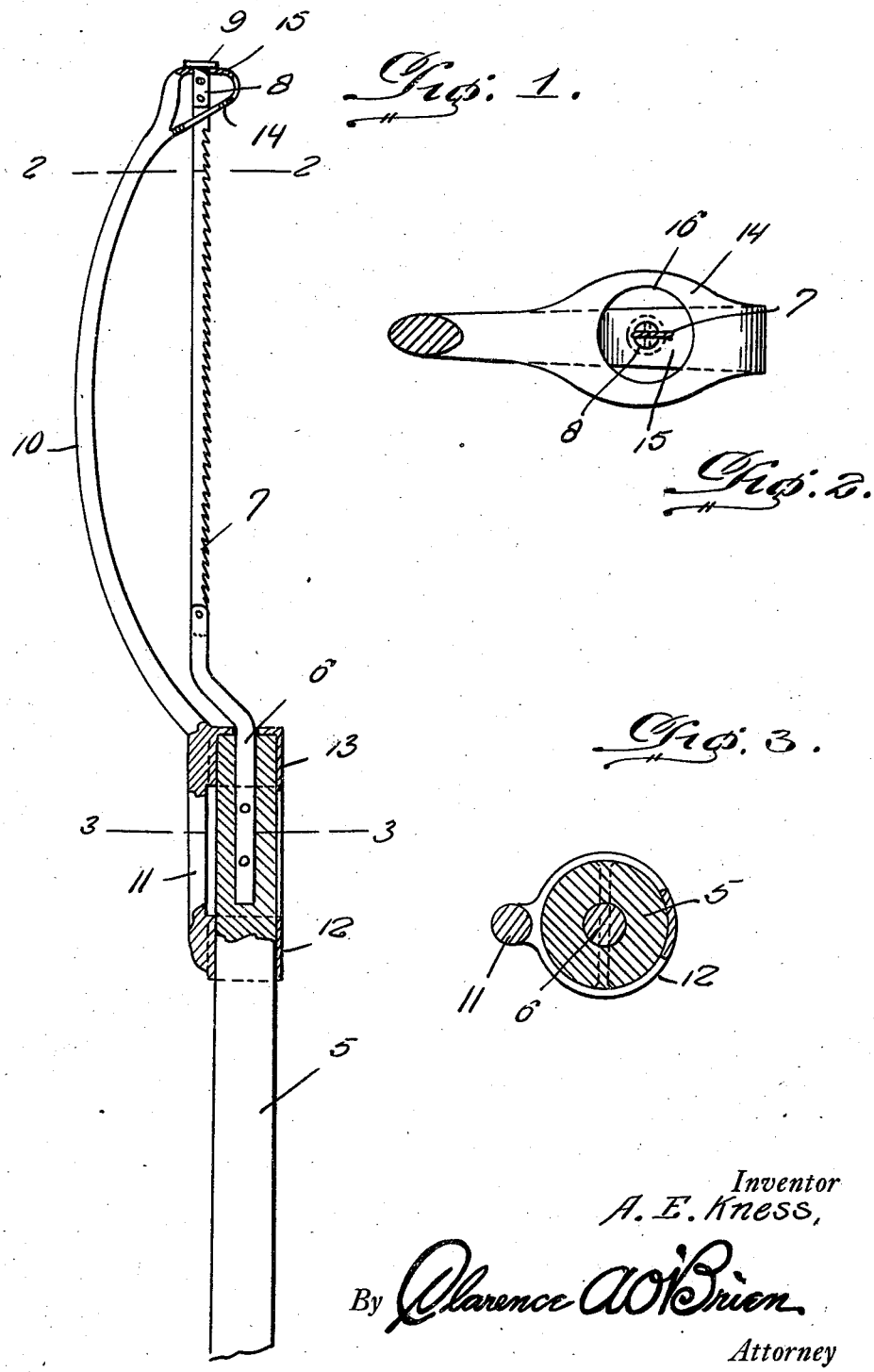

1,646,484

UNITED STATES PATENT OFFICE.

AUSTIN ENOS KNESS, OF AUDUBON, IOWA.

PRUNING SAW.

Application filed November 6, 1926. Serial No. 146,660.

This invention relates to pruning saws and has for its primary object to substantially improve and simplify the pruning saw construction shown and described in my co-pending application, Serial No. 81,449, filed January 15, 1926.

In the above mentioned application provision is made whereby the saw blade may be turned at any desired angle with respect to the bow-like frame in order that the proper pruning operations may be performed. In order to produce this result there is disclosed in the co-pending application a number of structural elements which are not believed absolutely necessary in order to bring about the desired result.

The improved form of the invention herein shown and described includes generally a handle, a stationary saw blade and blade straining frame that is so constructed and associated with the blade and handle so as to permit the turning of the same with respect to the blade and this in a highly novel, simple and quick manner.

Other objects will become apparent as the nature of the invention is better understood, the same comprising the novel form, combination, and arrangement of parts hereinafter more fully described, shown in the accompanying drawing and claimed.

In the accompanying drawing, wherein like numerals indicate like parts:

Figure 1 is a view partly in side elevation and partly in cross section of a pruning saw constructed in accordance with the present invention, Fig. 2 is an enlarged detailed transverse section taken substantially upon the line 2—2 of Fig. 1 and looking in a direction towards the front end of the saw and Fig. 3 is a similar view taken substantially upon the line 3—3 of Fig. 1 more clearly disclosing the construction of the handle attaching end of the said straining frame.

Now having particular reference to the drawing there is disclosed a pruning saw consisting of a handle 5 of circular formation at least at the straining frame attaching end and being of any desirable length. Anchored within the forward end of said handle 5 is a saw attaching bar 6 the outer projecting end of which is offset laterally inwardly and to the extreme end of which is rigidly attached one end of a suitable pruning saw blade 7 the extreme outer end of which is provided with a circular head 8 having a rounded plate 9 upon its outer end.

The invention further constitutes the provision of a bow-like straining frame 10 the extreme inner end of which is of plano configuration as indicated by the reference character 11. Upon the inner end of this plano portion of the frame is a collar 12 while upon the front end thereof is a cap 13, said collar and said cap adapted for engagement over the handle in such a manner as to permit the turning of the same thereon.

The outer end of the straining frame 10 is formed with a pair of inwardly extending spaced plates 14 and 15 respectively, the uppermost plate 15 of which is upon a horizontal plane while the lowermost plate 14 is inclined upwardly the outer ends of said plate being interconnected as clearly disclosed in Fig. 1. The lowermost plate 14 is formed with a relatively enlarged opening 16 while the outermost horizontal plate 15 is formed with a circular opening just large enough to receive circular heads 8 upon the end of said saw blade 7.

Obviously, by reason of the springy nature of the straining frame 10 the saw blade 7 is always maintained taut while said straining frame is also maintained against rotation upon the handle 5 and upon the headed end of the blade 7. However, when it is desired to change the position of the frame with respect to the saw blade 7 the straining frame may be forcibly moved to the desired position resulting in the attainment of the end desired in said co-pending application and this without requiring the provision of a plurality of structural elements.

It will thus be seen that I have considerably improved and simplified upon the type of pruning saw shown and described in the several claims mentioned in my prior application for United States Letters Patent as well as all types of pruning saws heretofore in use.

Having thus described my invention what I claim as new and desire to secure by Letters Patent is:

1. In a pruning saw of the class described, a handle, a saw blade rigidly connected at one end to the handle, a straining frame, means on the inner end of the frame whereby the same can be rotatably attached to the adjacent end of the handle, means associated with the outer ends of the frame and saw blade respectively, to permit the frame to be rotated around the blade to position the same at various angles with respect to the cutting edge of the blade, said means comprising a circular head on the outer end of the blade, a circular plate on the outer end of said head, a pair of laterally extending spaced plates formed on the outer end of said frame, the innermost plate being disposed at an incline, said plates having openings for receiving the circular head on the outer end of the blade, the circular plate on the outer end of the circular head engaging the outer face of the outermost laterally disposed plate.

2. In a pruning saw of the class described, a handle, a saw blade rigidly connected at one end to the handle, a straining frame, a spaced collar and cap on the inner end of the straining frame for loose engagement upon the saw attached end of the handle, whereby said frame is adapted for rotation upon the inner end portion of the handle, means at the opposite end of the frame whereby the outer end of the saw blade may be attached thereto so as to permit the frame to be rotated around the blade so as to position the same at various angles with respect to the cutting edge of the blade, said means comprising a circular head carried on the outer end of the saw blade, a circular plate on the outer end of said head, a pair of spaced laterally extending plates on the outer end of the frame, said plates being formed with registering openings to receive the circular head, the opening in the innermost plate being enlarged, the opening in the outermost laterally extending plate being slightly greater than the diameter of the circular head, the circular plate on the outer end of the head engaging the outer face of the outermost laterlly extending plate, the innermost laterly extending plate being disposed on an incline.

In testimony whereof I affix my signature.

AUSTIN ENOS KNESS.